Patented May 7, 1929.

1,711,504

UNITED STATES PATENT OFFICE.

HAROLD T. MAITLAND, OF SHARON HILL, PENNSYLVANIA, ASSIGNOR TO SUN OIL COMPANY, OF PHILADELPHIA, PENNSYLVANIA, A CORPORATION OF NEW JERSEY.

PROCESS OF MAKING FILTRATION AND DECOLORIZING ADSORBENTS.

No Drawing. Application filed February 6, 1924. Serial No. 691,026.

The object of my invention is to produce a filtering and bleaching (or decolorizing) agent having high adsorptive properties and capable of re-use for an indefinite number of times without substantial loss of efficiency.

My invention comprises a composition of silicic acid or silicic anhydride and aluminum hydroxide having certain physical characteristics hereinafter specified. My invention comprises also the process of making the product which involves a reaction between a soluble silicate (preferably water glass) and one of the alums.

In carrying out my process, I dilute the water glass to a free flowing liquid, dissolve ammonium aluminum sulfate in water, and mix the two solutions. A temperature above normal assists in precipitation. The alum solution may be added gradually, preferably by spraying, so as to secure an intimate admixture, and with agitation; producing a finer precipitate. The precipitate should be boiled in its filtrate until the reaction is complete. The product is washed free of salts easily soluble in water, and dehydrated at 500° to 1000° F. The reaction is believed to be as follows:

Water glass, $4Na_2Si_4O_9$ + aluminum ammonium sulfate and water of crystallization $(NH_4)_2SO_4.Al_2(SO_4)_3.24H_2O$ + water, $10H_2O$ = ortho silicic acid, $16H_4SiO_4$ + aluminum hydroxid, $Al_2(OH)_6$ + sodium sulfate, $4Na_2SO_4$ + ammonia, $2NH_3$.

The sodium sulfate washes out, while the ammonia goes off as a gas. Water is also driven off, successively converting the ortho silicic acid to meta silicic acid, $H_2SiO_3$, and then to adsorptive $SiO_2$.

The resultant product is a white compound, hard, dry and porous, and adsorptive, selective and active with respect to coloring matter in oils.

Instead of using ammonium aluminum sulfate, I may use aluminum sulfate, giving, it is believed, the following reaction:

$3Na_2Si_4O_9 + Al_2(SO_4)_3 + 27H_2O =$
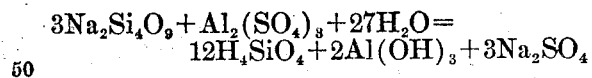
$12H_4SiO_4 + 2Al(OH)_3 + 3Na_2SO_4$ A highly important characteristic of my product is that it may be reclaimed, by reheating at the temperature of dehydration, without loss of efficiency. I have so reclaimed and reused the product a great number of times, without any measurable loss whatever in efficiency. Therefore, although my new adsorbent is not expensive to produce, the original cost is a factor of little, if any, importance.

Where, in the claims, I specify material containing $Al_2(SO_4)_3$, I mean to include ammonium aluminum sulfate as well as aluminum sulfate.

Having now fully described my invention, what I claim and desire to protect by Letters Patent is:

1. The process of making the herein described filtration and decolorizing medium, comprising reacting a soluble silicate with ammonium aluminum sulfate and dehydrating.

2. The process of making the herein described filtration and decolorizing medium which comprises gradually adding to a soluble silicate, material containing $Al_2(SO_4)_3$, with agitation, boiling, washing out the soluble salts, and dehydrating at between 500° and 1000° F.

3. The process of making the herein described filtration and decolorizing medium which comprises gradually adding to a soluble silicate ammonium aluminum sulfate, with agitation, boiling, washing out the soluble salts, and drying.

4. The process of making the herein described filtration and decolorizing medium which comprises gradually adding to a soluble silicate ammonium aluminum sulfate with agitation, boiling, washing out the soluble salts, and dehydrating at between 500° and 1000° F.

5. The process of making a composition of meta silicic acid and aluminum hydroxide which comprises intimately mixing an ammonium aluminum salt with a water glass solution to form a compound of ortho silicic acid and aluminum hydroxide and dehydrating to form an adsorptive compound of silicic anhydride and aluminum hydroxide.

6. The process of making a composition of meta silicic acid and aluminum hydroxide which comprises intimately mixing with a soluble silicate ammonium aluminum sulphate, boiling until the reaction is substantially complete, allowing the ammonium to escape and washing out the sodium sulfate, and dehydrating at between 500° and 1000° F.

7. The process of making a composition of meta silicic acid and aluminum hydroxide which comprises adding an ammonium aluminum salt to a water glass solution, with agitation, to form a compound of ortho silicic acid and aluminum hydroxide and dehydrating to form an adsorptive compound of silicic anhydride and aluminum hydroxide.

8. The process of making a composition of meta silicic acid and aluminum hydroxide which comprises adding to a soluble silicate ammonium aluminum sulphate, with agitation, boiling until the reaction is substantially complete, allowing the ammonium to escape and washing out the sodium sulfate, and dehydrating at between 500° and 1000° F.

9. The process of making the herein described filtration and decolorizing medium which comprises reacting a soluble silicate with material containing $Al_2(SO_4)_3$ and dehydrating at between 500° and 1000° F.

In testimony of which invention, I have hereunto set my hand, at Norwood, Penna., on this first day of February, 1924.

HAROLD T. MAITLAND.